US008458903B2

(12) United States Patent
Takahashi et al.

(10) Patent No.: US 8,458,903 B2
(45) Date of Patent: Jun. 11, 2013

(54) METHOD OF PRODUCING AN ELASTIC PLATE MEMBER FOR A LIQUID JET HEAD

(75) Inventors: Tomoaki Takahashi, Nagano (JP); Minoru Watanabe, Nagano (JP); Atsushi Furuhata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 740 days.

(21) Appl. No.: 12/137,056

(22) Filed: Jun. 11, 2008

(65) Prior Publication Data

US 2008/0244906 A1 Oct. 9, 2008

Related U.S. Application Data

(60) Division of application No. 11/604,686, filed on Nov. 28, 2006, now abandoned, which is a continuation of application No. 10/692,747, filed on Oct. 27, 2003, now Pat. No. 7,159,315, which is a division of application No. 09/489,893, filed on Jan. 24, 2000, now Pat. No. 6,666,547.

(30) Foreign Application Priority Data

Jan. 29, 1999 (JP) ................................. P. 11-21450
Nov. 19, 1999 (JP) ............................... P. 11-329241

(51) Int. Cl.
*B21D 53/76* (2006.01)
*H01M 4/04* (2006.01)

(52) U.S. Cl.
USPC .......... 29/890.1; 29/469.5; 29/25.35; 429/94; 216/20

(58) Field of Classification Search
USPC .................. 29/890.1, 527.1, 469.5, 846, 847, 29/831; 429/94, 129, 130; 216/13, 20
See application file for complete search history.

(56) References Cited

U.S. PATENT DOCUMENTS 2,860,328 A 11/1958 Langworthy
3,527,667 A 9/1970 Larsen
4,574,445 A 3/1986 Bentin et al.
4,731,304 A * 3/1988 Lundquist et al. ........ 429/145 X
4,846,747 A 7/1989 Higashinakagawa et al.
4,937,597 A 6/1990 Yasuhara et al.
5,008,689 A 4/1991 Pan et al.

(Continued)

FOREIGN PATENT DOCUMENTS

EP 0 616 890 A1 9/1994
JP 56-135076 10/1981

(Continued)

OTHER PUBLICATIONS

An Encyclopedia of Metallurgy and Materials, C.R. Tottle, p. 73
Dictionary of Metallurgy, Colin D. Brown.

(Continued)

*Primary Examiner* — A. Dexter Tugbang
(74) *Attorney, Agent, or Firm* — Sughrue Mion, PLLC

(57) ABSTRACT

A method for producing an elastic plate for a liquid jet head, which includes etching a rolled metal plate based on a rolling direction of the rolled metal plate, to form an etched portion and a non-etched portion on the rolled metal plate. The thickness of the etched portion is thinner than the thickness of the non-etched portion and the rolling direction is substantially perpendicular to a long side of the rolled metal plate.

5 Claims, 7 Drawing Sheets

U.S. PATENT DOCUMENTS

| | | | | |
|---|---|---|---|---|
| 5,189,437 A | | 2/1993 | Michaelis et al. | |
| 5,388,326 A | * | 2/1995 | Beeson et al. | 29/890.1 X |
| 5,506,608 A | | 4/1996 | Marler | |
| 5,537,133 A | | 7/1996 | Marler et al. | |
| 5,560,795 A | * | 10/1996 | Bruckner et al. | 29/846 X |
| 5,580,676 A | * | 12/1996 | Honda et al. | 429/129 X |
| 5,595,835 A | * | 1/1997 | Miyamoto et al. | 429/94 X |
| 5,604,522 A | | 2/1997 | Miura et al. | |
| 5,837,155 A | * | 11/1998 | Inagaki et al. | 216/20 X |
| 5,963,234 A | | 10/1999 | Miyazawa et al. | |
| 6,193,360 B1 | | 2/2001 | Nishiwaki et al. | |

FOREIGN PATENT DOCUMENTS

| | | | | |
|---|---|---|---|---|
| JP | 02247008 A | * | 10/1990 | 29/469.5 X |
| JP | 03239559 A | * | 10/1991 | 29/890.1 X |
| JP | 5-338159 | | 12/1993 | |
| JP | 7-156385 | | 6/1995 | |
| JP | 8-166580 A | | 6/1996 | |
| JP | 8-187868 A | | 7/1996 | |
| JP | 9-033722 A | | 7/1997 | |
| JP | 09-291718 | | 8/1997 | |
| JP | 9-314863 A | | 9/1997 | |
| JP | 9-267489 | | 10/1997 | |
| JP | 9-314836 | | 12/1997 | |
| JP | 11-155587 | | 9/1999 | |
| WO | 93-23590 | | 12/1993 | |

OTHER PUBLICATIONS

Japanese Abstract No. 10/193,612, dated Jul. 28, 1998.

Westberg et al., "A Novel CMOS-Compatible Inkjet Head", Transducers '97, 1997 International Conference on Solid-State Sensors and Actuators, Chicago, Jun. 1997, vol. 2, pp. 813-816.

* cited by examiner

METHOD OF PRODUCING AN ELASTIC PLATE MEMBER FOR A LIQUID JET HEAD

CROSS-REFERENCE TO RELATED APPLICATIONS

This is a Divisional Application of U.S. application Ser. No. 11/604,686 filed Nov. 28, 2006, which is a Continuation Application of application Ser. No. 10/692,747 filed Oct. 27, 2003, which has matured into U.S. Pat. No. 7,159,315 and which is a Divisional Application of application Ser. No. 09/489,893 filed Jan. 24, 2000, which has matured into U.S. Pat. No. 6,666,547. The entire disclosures of the prior applications are considered part of the disclosure of the accompanying application and are hereby incorporated by reference.

BACKGROUND OF THE INVENTION

The present invention relates to an ink jet recording head in which a piezoelectric vibrator of a longitudinal vibration mode is used as a driving source, and more particularly to a structure of an elastic plate which receives a pressure due to a displacement of a piezoelectric vibrator, and also to a method of producing such a plate.

In order to improve the recording density, the pitch of nozzle opening rows tends to be reduced. To comply with this tendency, a single crystal silicon wafer is isotropically etched, and a nozzle plate and an elastic plate which are produced another method are fixed to the etched wafer, thereby configuring a channel unit. A displacement of a piezoelectric vibrator is transmitted to the channel unit so as to produce a pressure in a pressure generating chamber, and an ink droplet is ejected from a nozzle opening by the pressure.

When pressure generating chambers are arranged in high density, each of the pressure generating chambers has a very small width. In order to cause the whole of the longitudinal direction of a pressure generating chamber to be efficiently deformed, therefore, a configuration is employed in which a convex portion, or a so-called island portion that elongates in the longitudinal direction of the pressure generating chamber is formed on the surface of the elastic plate, and the displacement of the piezoelectric vibrator is transmitted via the island portion to a wide region of the elastic plate sealing the pressure generating chamber.

It has been proposed that a polymer film or a metal thin plate is used as such an elastic plate, a metal plate member, for example, a stainless steel plate which has a relatively large thickness so as to ensure the rigidity of the elastic plate is laminated onto the surface of the elastic plate, and the stainless steel plate is etched, thereby forming an island portion which transmits a displacement of a piezoelectric vibrator to the whole of a pressure generating chamber, and a diaphragm portion which is elastically deformed by the displacement of the island portion to change the capacity of the pressure generating chamber (WO93/25390).

However, this proposed configuration has the following problem. The coefficient of thermal expansion of the plate member serving as the elastic plate, particularly a polymer film is largely different from that of the metal plate for ensuring the rigidity. Furthermore, heat applied during the production process causes polymer materials to shrink. During the process of producing the channel unit, therefore, the plate member is flexurally deformed and a positional error occurs between the plate member and a channel forming substrate.

SUMMARY OF THE INVENTION

The invention has been conducted in view of the problem. It is an object of the invention to provide an ink jet recording head in which deformation of a plate member during a production process can be suppressed as far as possible, whereby the production process can be simplified.

It is a second object of the invention to provide a method of producing such a plate member.

A plate member according to the present invention is configured by a substantially rectangular base member of a laminated structure including an elastic plate and a rolled metal plate that are laminated with each other. The elastic plate is elastically deformable by an external pressure, and has an ink resistance. The rolled metal plate is produced by rolling an etchable metal material. A longitudinal direction of the base member is perpendicular to a rolling direction of the rolled metal plate.

Usually, the rigidity of a metal material is large in a direction perpendicular to the rolling direction. Therefore, warpage which is likely to occur in the longitudinal direction is suppressed by the rigidity that is enhanced by the directionality of rolling.

An ink jet recording head according to an embodiment includes a nozzle opening, a pressure generating chamber, a reservoir, and an ink supply port. At least the pressure generating chamber or the reservoir is sealed by a plate member which is partly elastically deformable. The plate member is configured by a substantially rectangular base member in which an elastic plate that can be elastically deformed by an external pressure, and that has an ink resistance, and a rolled metal plate that is produced by rolling an etchable metal material are laminated with each other. A longitudinal direction of the base member is perpendicular to a rolling direction of the rolled metal plate. Therefore, the rigidity in the direction perpendicular to the rolling direction is large, warpage which easily occurs in the longitudinal direction can be suppressed by the rigidity that is enhanced by the directionality of rolling, and the positioning accuracy in an assembly process can be ensured.

The present disclosure relates to the subject matter contained in Japanese patent application Nos. Hei. 11-21450 (filed on Jan. 29, 1999), and Hei. 11-329241 (filed on Nov. 19, 1999), which are expressly incorporated herein by reference in their entireties.

DESCRIPTION OF THE PREFERRED EMBODIMENT

Hereinafter, the invention will be described in detail with reference to illustrated embodiments.

Figure 1:
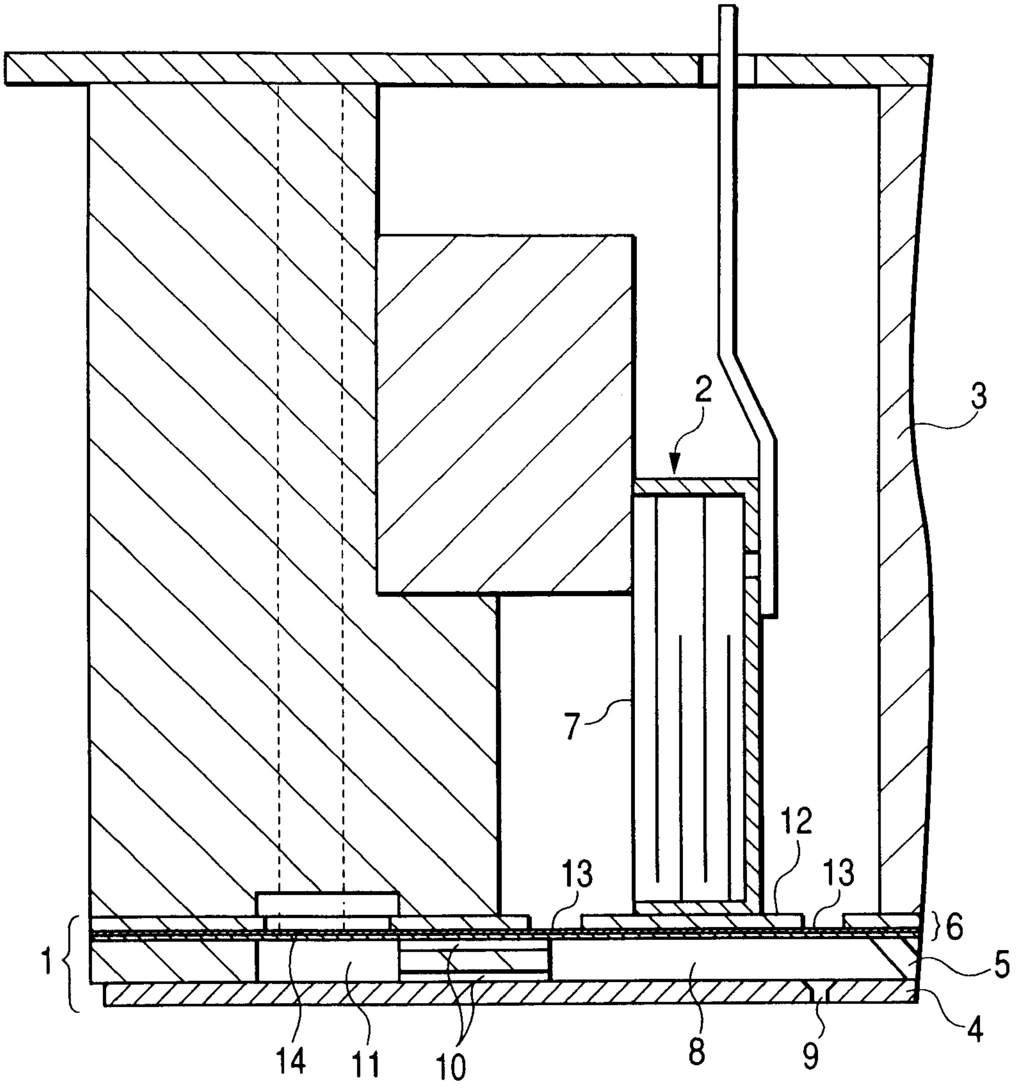
FIG. 1 is a section view showing an embodiment of the ink jet recording head of the invention, and taken in the longitudinal direction of a pressure generating chamber.

FIG. 1 shows an embodiment of the ink jet recording head of the invention. The ink jet recording head is configured by integrally fixing a channel unit 1 and a piezoelectric vibrator unit 2 via a head holder 3. The channel unit 1 is configured by laminating a nozzle plate 4, a channel forming substrate 5, and a plate member 6. Pressure generating chambers 8 are contracted and expanded by expansion and contraction of respective piezoelectric vibrators 7 of the piezoelectric vibrator unit 2, thereby ejecting ink droplets.

The nozzle plate 4 is formed with nozzle openings 9 which respectively communicate with the pressure generating chambers 8, and the channel forming substrate 5 is formed with the pressure generating chambers 8, ink supply ports 10, and reservoirs 11. In this embodiment, a common reservoir 11 is provided for each row of the pressure generating chambers 8, and ink supply ports 10 are provided to communicates the common reservoir 11 with the corresponding row of the pressure generating chambers 8.

Figure 2:
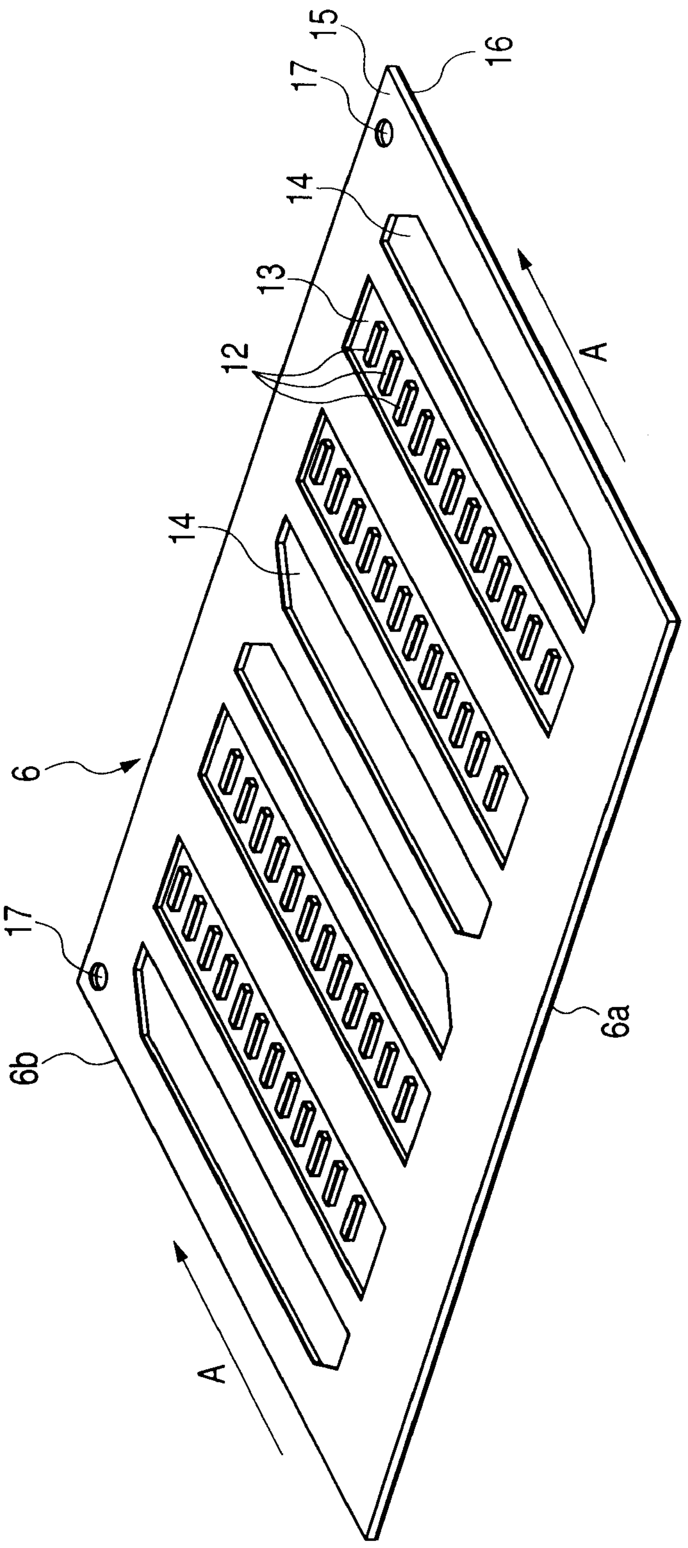
FIG. 2 is a view showing an embodiment of an elastic plate used in the recording head.

As shown in FIG. 2, the plate member 6 is formed with island portions 12 for abutment against the respective tip ends of the piezoelectric vibrators 7, and elastically deformable diaphragm portions 13. In this embodiment, a diaphragm portion 13 is provided to surround each row of island portions 12, and the diaphragm portion 13 and the corresponding row of the island portions 12 are located to be opposed to the corresponding row of the pressure generating chambers 8 as shown in FIG. 1. A diaphragm portion 14 which is similar to the diaphragm portion 13 is formed in the region opposed to the corresponding reservoir 11.

As shown in FIG. 2, the plate member 6, which is one of features of the invention, is configured by using a base member that is formed by lamination of a polymer film 16 such as a polyphenylene sulfide (PPS) resin and a rolled metal plate 15 by bonding or thermal welding. The rolled metal plate has a thickness of about 10 to 30 .mu.m and is obtained by rolling a high-rigidity and etchable material such as stainless steel in one direction. The polymer film can be elastically deformed by a displacement of the piezoelectric vibrators 7, and has a corrosion resistance to an ink.

The polymer film 16 may be laminated onto the metal plate 15 after the film is previously annealed at a temperature at which the film is not softened, for example, about 80 to 150.degree. C. In this case, shrinkage is already completed as a result of the annealing process. Therefore, this is preferable because shrinkage does not occur in subsequent steps and warpage can be suppressed to a very low degree.

The base member is cut so that the long side 6*a* of each plate member 6 elongates in the direction perpendicular to the rolling direction (the direction of the arrow A in the figure) of the rolled metal plate 15. Positioning holes 17 in the form of through holes are opened in appropriate positions of the plate member. Thereafter, regions where the diaphragm portions 13 and 14 are to be formed are etched away, whereby the island portions 12 are formed from the rolled metal plate 15. Alternatively, prior to cutting the base member into a plurality of plate members 6, the regions where the diaphragm portions 13 and 14 are to be formed are etched away, so that the diaphragm portions 13 and 14 for a plate member 6 are arrayed in a direction perpendicular to the rolling direction, and the island portions 12 are formed from the rolled metal plate 15. Thereafter, the positioning holes 17 are opened in appropriate positions, and finally the base member is cut so that the short side 6*b* of each plate member 6 elongates in the rolling direction of the rolled metal plate 15.

The plate member 6 which has been formed as described above is positioned by using the positioning holes 17 on one face of the channel forming substrate 5 having the nozzle plate 4 laminated onto the other face thereof, so that the island portions 12 and the diaphragm portions 13 are located in specified positions with respect to the pressure generating chambers 8, and the plate member 6 is then laminated onto the substrate 5.

Since the plate member 6 is configured so that that the long side 6*a* elongates in the direction perpendicular to the rolling direction of the rolled metal plate 15, the rigidity in the direction of the long side of the rolled metal plate 15 is larger by about 10% than that in the direction of the short side, and hence warpage is smaller in degree by about 30% than that in the prior art. During the laminating process, therefore, the positioning of the plate member 6 with respect to the channel forming substrate 5, more specifically, positioning of the island portions 12 and the diaphragm portion 13 with respect to the pressure generating chambers 8 can be correctly performed. Furthermore, the plate member 6 can be bonded to the channel forming substrate 5 without forming an air gap therebetween.

Since the polymer film 16 is previously annealed, the film does not shrink even when the film is heated during the work of bonding the film to the rolled metal plate 15, and hence warpage in the plate member 6 can be suppressed to a small degree. Moreover, the elastic modulus is substantially maintained to be equal to that attained before the bonding. Therefore, the diaphragm portion 14 is sufficiently deformed by a pressure exerted by an ink which reversely flows from the ink supply port into the reservoir 11 during the ink droplet ejection, so that pressure variation is surely absorbed by a large compliance.

Figure 3:
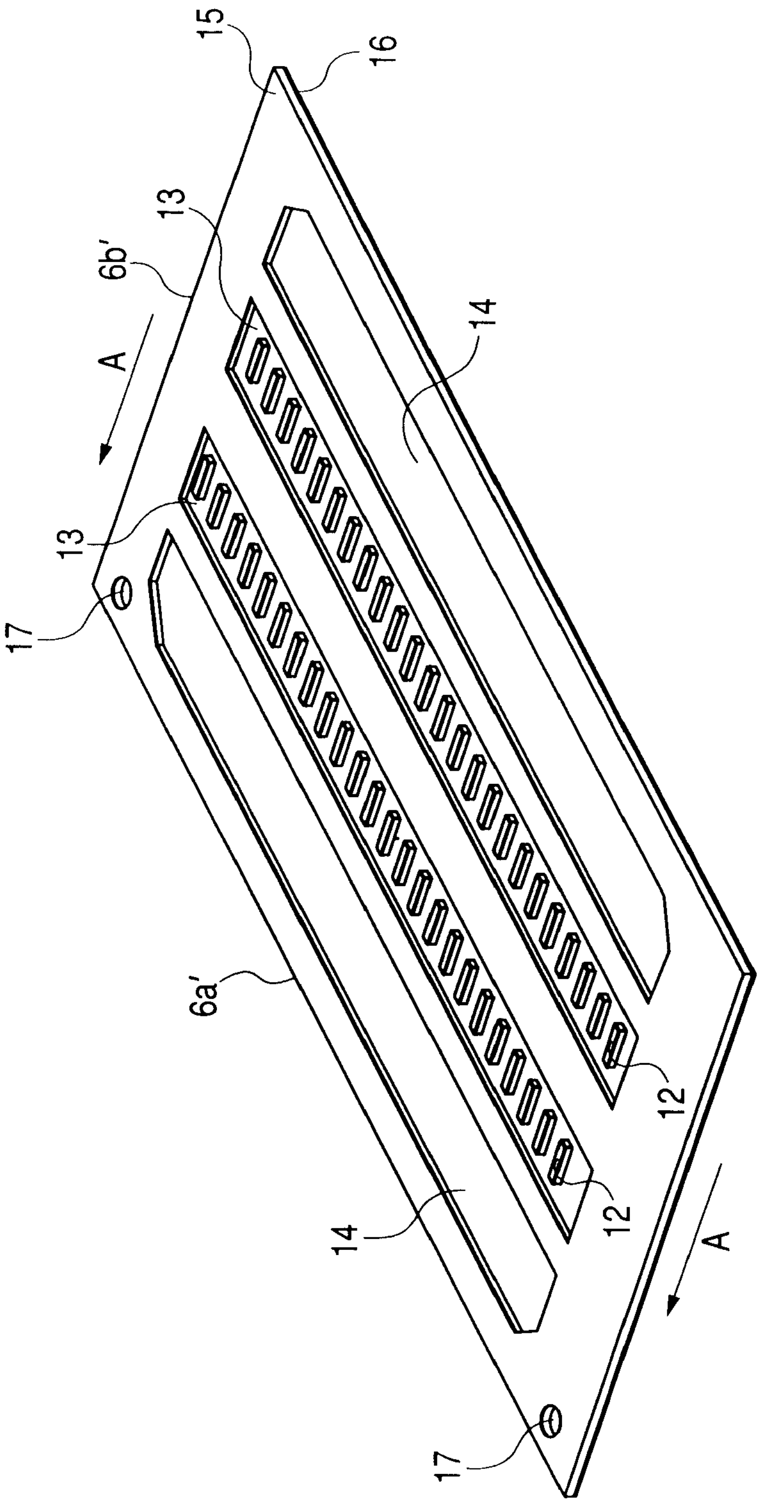
FIG. 3 is a view showing another embodiment of the elastic plate used in the recording head.

In the embodiment described above, the rows of the reservoirs and the island portions are arranged in the direction perpendicular to the rolling direction of the metal plate 15 constituting the plate member 6. Alternatively, as shown in FIG. 3, a large number of the island portions 12 may be arranged in each of a small number of rows, resulting in that the length of the arrangement of the island portions 12 is large. In this case, the metal plate 15 may be cut out so that the arrangement direction of the island portions 12, namely the long side 6*a*' is perpendicular to the rolling direction (the direction of the arrow A in the figure) of the metal plate 15, or the short side 6*b*' is parallel to the rolling direction. In this case also, the same effects as described above can be attained.

Figure 4:
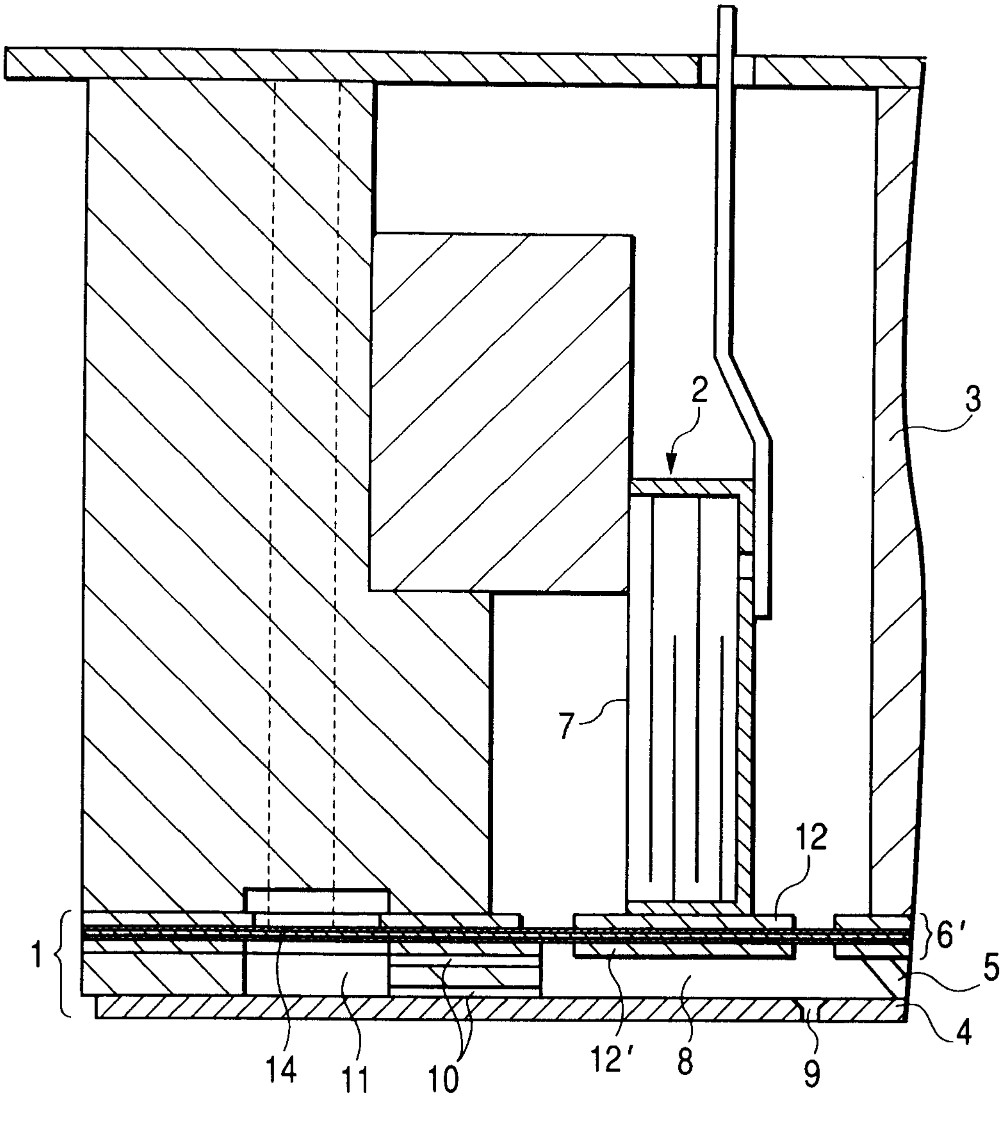
FIG. 4 is a section view showing another embodiment of the ink jet recording head of the invention, and taken in the longitudinal direction of a pressure generating chamber.

In the embodiment described above, the rolled metal plate 15 is laminated only onto the one face of the polymer film 16. As shown in FIG. 4, the rolled metal plate 15 may be laminated onto both the faces of the polymer film 16, etching is performed with using the polymer film 16 as the symmetry plane to form second island portions 12' which can respectively enter the pressure generating chambers 8, and the metal plate on the inner face and opposed to the reservoir 11 is etched away to ensure the diaphragm portion 14. In this case also, the same effects as described above can be attained.

Figure 5:
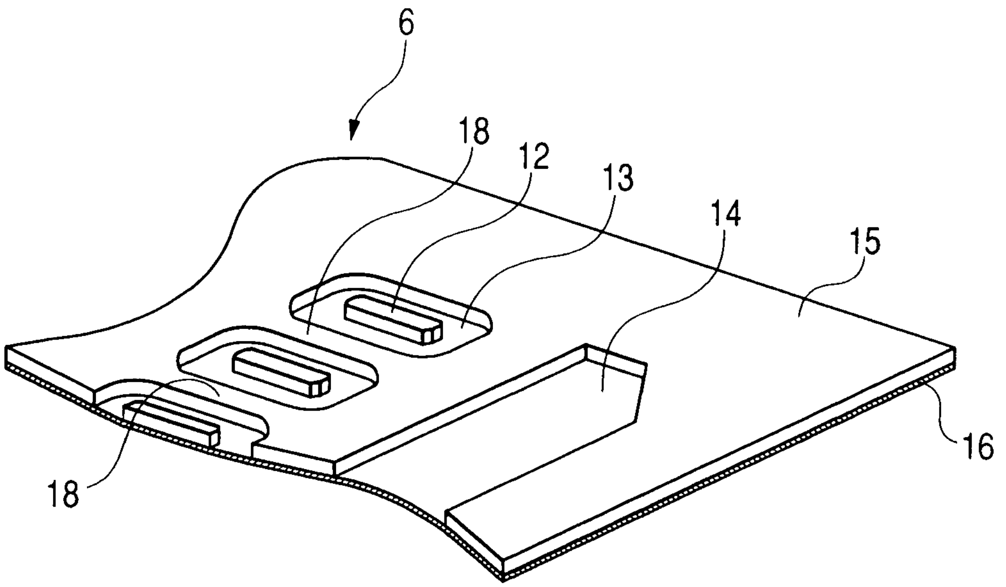
FIG. 5 is an enlarged view of an island portion of an elastic plate of another embodiment of the invention.

In the embodiment described above, only the island portions 12 are formed in the diaphragm portions 13. As shown in FIG. 5, regions which are respectively opposed to walls separating the adjacent pressure generating chambers 8 may be formed as unetched regions so as to form bridge portions 18. In this case, the bridge portions 18 function as reinforcing members.

In the invention, the anisotropy of the rigidity of a rolled metal plate which is used as the base metal is suitably applied to the structure of an ink jet recording head. Consequently, the invention can be applied not only to a recording head of the type in which a pressure generating chamber is contracted and expanded by a piezoelectric vibrator that expands and contracts in the axial direction, and also to components constituting a recording head in which a plate-like piezoelectric vibrator is used and ink droplets are ejected by flexural deformation. Also in the latter case, the same effects as described above can be attained.

Figure 6:
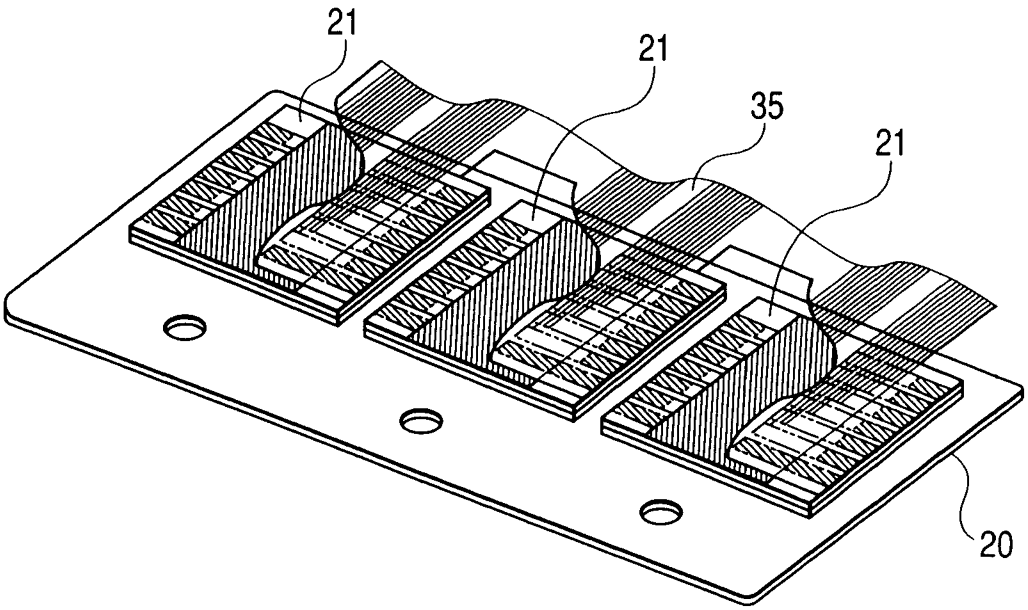
FIG. 6 is a view schematically showing an ink jet recording head which uses a flexural vibrator as a driving source, and to which the present invention is applicable.

Specifically, the invention may be applied also to a recording head in which, as shown in FIG. 6, nozzle opening rows that are divided into plural groups are formed in a single channel unit 20, and plural (in the embodiment, three) actuator units 21 for pressurizing an ink are attached to the channel unit.

Figure 7:
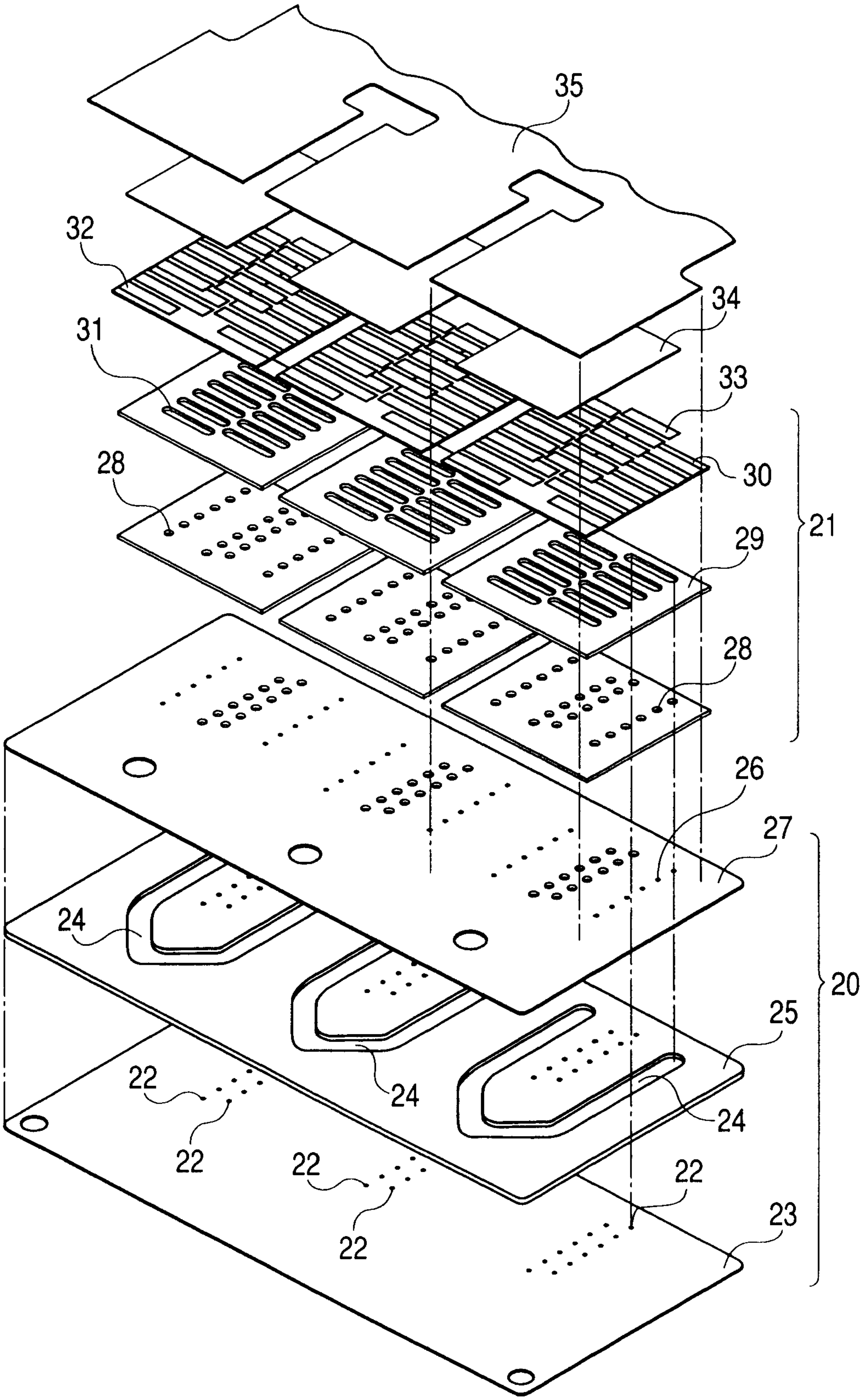
FIG. 7 is an exploded perspective view showing the structure of the recording head shown in FIG. 6.

FIG. 7 shows components constituting the recording head of FIG. 6, in an exploded manner. The channel unit 20 is configured by laminating: a nozzle plate 23 in which nozzle openings 22 are formed; a reservoir forming substrate 25 in which communication holes for forming reservoirs 24 are opened; and a plate member 27 which seals other faces of the reservoirs to form communication holes 26 between the reservoirs 24 and the actuator units 21, and which functions as an attachment member for the actuator units 21.

Each of the actuator units 21 is configured by sequentially laminating a sealing substrate 28, a pressure generating chamber forming substrate 29, and a diaphragm 30. Lower electrodes 32 are separately formed on the surface of the diaphragm 30 so as to respectively correspond to pressure generating chambers 31. A layer of a piezoelectric vibrator 33 made of an electrostriction material is formed in correspondence with the surfaces of the lower electrodes 32. An upper electrode 34 is formed on the surface of the piezoelectric vibrator 33 so as to receive a supply of a driving signal through a flexible cable 35.

As the plate member 27 of the thus configured recording head, the member described above may be used.

Figure 8:
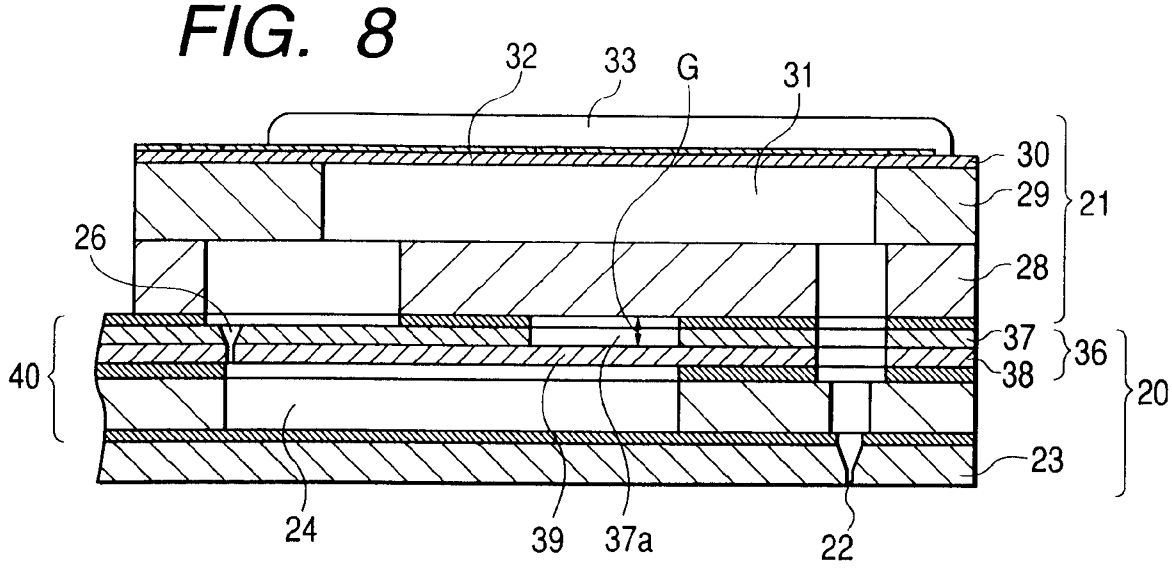
FIG. 8 is a section view showing the structure in the case where the invention is applied to the recording head shown in FIG. 6.

FIG. 8 shows an embodiment of the ink jet recording head in which the member described above is used. In the figure, 36 denotes a plate member. The plate member 36 is configured by a base member formed by laminating a polymer film 38 such as a polyphenylene sulfide (PPS) resin, onto a rolled metal plate 37 by thermal welding or bonding. The rolled metal plate 37 has a thickness of about 10 to 30 .mu.m and is obtained by rolling a high-rigidity and etchable material such as stainless steel in one direction. The polymer film 38 can be elastically deformed by variation of the ink pressure in the reservoir 24 to exhibit a compliance, and has a corrosion resistance to an ink. The polymer film 38 may be laminated onto the metal plate 37 after the film 38 is previously annealed at a temperature at which the film 38 is not softened, for example, about 80 to 150.degree. C. In this case, shrinkage is already completed as a result of the annealing process. Therefore, this is preferable because shrinkage does not occur in subsequent steps and warpage can be suppressed to a very low degree.

The plate member 36 is configured by cutting the base member so that the long side of the plate member 36 (i.e., the arrangement direction of the actuator units 21) elongates in the direction perpendicular to the rolling direction of the rolled metal plate 37, and by etching away regions of the metal plate 37 which are opposed to the reservoirs 24, to form compliance applying portions 39.

In the thus formed plate member 36, one face of the polymer film 38 in the compliance applying portions 39 is opposed to the reservoirs 24, and the other face of the polymer film 38 which is exposed through recesses 37*a* formed by removing away the metal plate 37 is opposed to the actuator units 21 via an air gap G formed by an adhesive agent layer 40. According to this configuration, even when an ink that is pressurized in the corresponding pressure generating chamber 31 by a displacement of the piezoelectric vibrator 33 reversely flows through a communication hole 26 to raise the pressure in the reservoir 24, the compliance applying portion 39 formed by the polymer film 38 is displaced to absorb the pressure variation in the reservoir 24.

Since the short side is parallel to the rolling direction of the metal plate 37 constituting the plate member 36, the rigidity can be maintained and warpage and the like can suppressed as far as possible even when the length of the side in the arrangement direction of the plural actuator units 21 is large.

In the embodiments described above, stainless steel is used as the rolled metal plate. Another metal which can be rolled and etched and has high adhesive properties, such as copper, nickel, or iron may be used with attaining the same effects as described above.

In the embodiments described above, a polyphenylene sulfide (PPS) resin is used as the polymer film. Another polymer material may be used such as a polyimide (PI) resin, a polyether imide (PEI) resin, a polyamide-imide (PAI) resin, a polyparabanic acid (PPA) resin, a polysulfone (PSF) resin, a polyethersulfone (PES) resin, a polyether ketone (PEK) resin, a polyether ether ketone (PEEK) resin, a polyolefin (APO) resin, a polyethylene naphthalate (PEN) resin, an aramid resin, a polypropylene resin, a vinylidene chloride resin, or a polycarbonate resin.

In the embodiments described above, a layer which has an etching resistance and which is elastically deformable is formed by a polymer film. It is apparent that, even when any other material such as alumina or a metal which has an etching resistance and which can be deformed by variation of the ink pressure in a reservoir or a displacement of a piezoelectric vibrator is used, the same effects as described above can be attained.

Figure 9A:
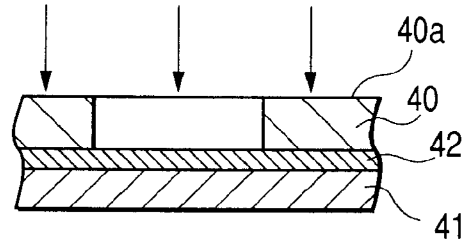
FIGS. 9(*a*) and 9(*b*) are views respectively showing production methods in the case where an elastic region is formed by a metal plate.
Figure 9B:
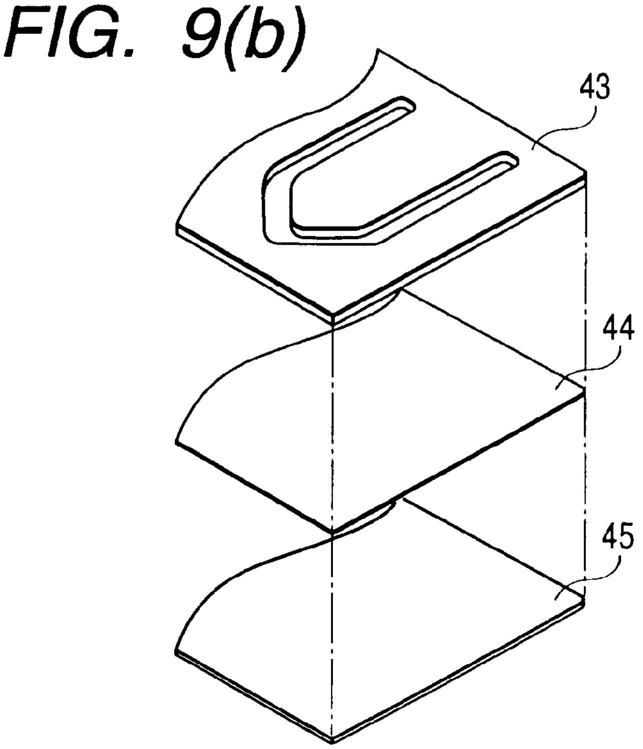

When the elastically deformable region is configured by a metal material, the configuration shown in FIG. 9(*a*) may be employed. In the configuration, a rolled metal plate 40, and a metal plate 41 constituting the elastically deformable region are laminated via an adhesive agent layer 42 having an etching resistance. Etching is performed on the surface 40*a* of the rolled metal plate 40 so that the adhesive agent layer 42 functions as an etching stopper, thereby enabling only the rolled metal plate 40 to be selectively etched.

Alternatively, as shown in FIG. 9(*b*), a rolled metal plate 43 which has undergone an etching process is laminated onto a metal plate 45 constituting the elastically deformable region, by a film 44 forming an adhesive agent.

What is claimed is:

1. A method for producing a liquid jet head, the method comprising:
- providing a rolled metal plate;
- cutting the rolled metal plate so that the rolled metal plate has a longer side and a shorter side and the rolling direction of the rolled metal plate is arranged along the shorter side of the rolled metal plate;
- laminating the rolled metal plate and a polymer film to form a plate member;

laminating a nozzle plate formed with nozzle openings, a channel forming substrate having liquid channels connecting to the nozzle openings and the plate member to form a channel unit having pressure generating chambers; and integrally fixing the channel unit and a piezoelectric vibrator unit which produces a pressure in the pressure generating chambers.

2. The method for producing a liquid jet head according to claim 1, wherein the laminating the rolled metal plate and the polymer film comprises laminating by bonding.

3. The method for producing a liquid jet head according to claim 1, wherein the laminating the rolled metal plate and the polymer film comprises laminating by thermal welding.

4. The method for producing a liquid jet head according to claim 1, wherein the rolled metal plate has a substantially rectangular shape.

5. The method for producing a liquid jet head according to claim 1, wherein the polymer film is made of a polyimide resin.

* * * * *